US008826648B2

(12) United States Patent
Baumeister

(10) Patent No.: US 8,826,648 B2
(45) Date of Patent: Sep. 9, 2014

(54) METHOD FOR SELECTIVE CATALYTIC REDUCTION OF NITROGEN OXIDES IN EXHAUST GAS OF INTERNAL-COMBUSTION ENGINES

(75) Inventor: Thomas Baumeister, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 643 days.

(21) Appl. No.: 13/105,722

(22) Filed: May 11, 2011

(65) Prior Publication Data

US 2011/0210836 A1 Sep. 1, 2011

Related U.S. Application Data

(63) Continuation of application No. PCT/EP2009/007465, filed on Oct. 17, 2009.

(30) Foreign Application Priority Data

Nov. 12, 2008 (DE) .................... 10 2008 056 860

(51) Int. Cl.
| | | |
|---|---|---|
| *F01N 3/00* | (2006.01) | |
| *F01N 3/10* | (2006.01) | |
| *B60Q 1/00* | (2006.01) | |
| *F01N 3/20* | (2006.01) | |

(52) U.S. Cl.
CPC .............. *F01N 3/208* (2013.01); *F01N 3/2066* (2013.01); *F01N 2550/05* (2013.01); *F01N 2610/02* (2013.01); *F01N 2610/10* (2013.01); *F01N 2610/105* (2013.01); *F01N 2610/1406* (2013.01); *F01N 2610/1486* (2013.01); *F01N 2900/0412* (2013.01); *F01N 2900/1811* (2013.01); *F01N 2900/1814* (2013.01)
USPC .................. 60/295; 60/274; 60/286; 60/301; 340/438

(58) Field of Classification Search
CPC ........ F01B 3/2066; F01B 2/208; F01B 11/00; F01B 2550/05; F01B 2610/02; F01B 2610/10; F01B 2610/105; F01B 2610/1406; F01B 2610/1486; F01B 2900/0412; F01B 2900/1811; F01B 2900/1814
USPC ............. 60/274, 286, 295, 301, 303; 340/438
See application file for complete search history.

(56) References Cited

U.S. PATENT DOCUMENTS

| 6,442,932 B1 | 9/2002 | Hofmann et al. |
| 7,912,360 B2 * | 3/2011 | Gschwind ..................... 392/456 |

(Continued)

FOREIGN PATENT DOCUMENTS

| DE | 198 18 448 A1 | 10/1999 |
| DE | 102 34 561 A1 | 2/2004 |

(Continued)

OTHER PUBLICATIONS

Chinese Office Action including English translation dated Oct. 8, 2012 (Ten (10) pages).

(Continued)

*Primary Examiner* — Audrey K Bradley
(74) *Attorney, Agent, or Firm* — Crowell & Moring LLP

(57) ABSTRACT

A method is provided for the selective catalytic reduction of nitrogen oxides in the exhaust gas of internal-combustion engines in motor vehicles. An electronic control device, by way of a signal of a sensor in a reducing agent tank, detects whether a reducing agent is in a frozen state. The electronic control device applies heating current to a PTC heating element in the reducing agent tank if the reducing agent is in a frozen state, calculates the resistance of the PTC heating element from the onboard voltage of the motor vehicle and the heating current, and compares the resistance with a first defined resistance threshold and/or with a first defined gradient threshold of the increase in resistance. The amount of reducing agent fed into the exhaust gas from the reducing agent tank is reduced if the first resistance threshold and/or the first gradient threshold is exceeded.

8 Claims, 1 Drawing Sheet

(56) References Cited

U.S. PATENT DOCUMENTS

| | | | |
|---|---|---|---|
| 2009/0028533 A1* | 1/2009 | Starck | 392/451 |
| 2009/0065508 A1 | 3/2009 | Haeberer et al. | |
| 2009/0077949 A1 | 3/2009 | Kleinknecht | |
| 2010/0050606 A1* | 3/2010 | Fulks et al. | 60/286 |

FOREIGN PATENT DOCUMENTS

| | | | | |
|---|---|---|---|---|
| DE | 10 2004 052 189 A1 | 5/2006 | | |
| DE | 10 2005 025 724 A1 | 12/2006 | | |
| DE | 10 2005 046 029 A1 | 3/2007 | | |
| DE | 10 2006 027 487 A1 | 3/2007 | | |
| DE | 10 2007 017 489 A1 | 10/2008 | | |
| WO | WO 2007006393 A1 * | 1/2007 | | H05B 3/50 |

OTHER PUBLICATIONS

German Search Report dated May 5, 2009 including partial English-language translation (Nine (9) pages).
International Search Report dated Jan. 13, 2010 including English-language translation (Four (4) pages).
German Office Action dated May 22, 2014 (five pages).

* cited by examiner

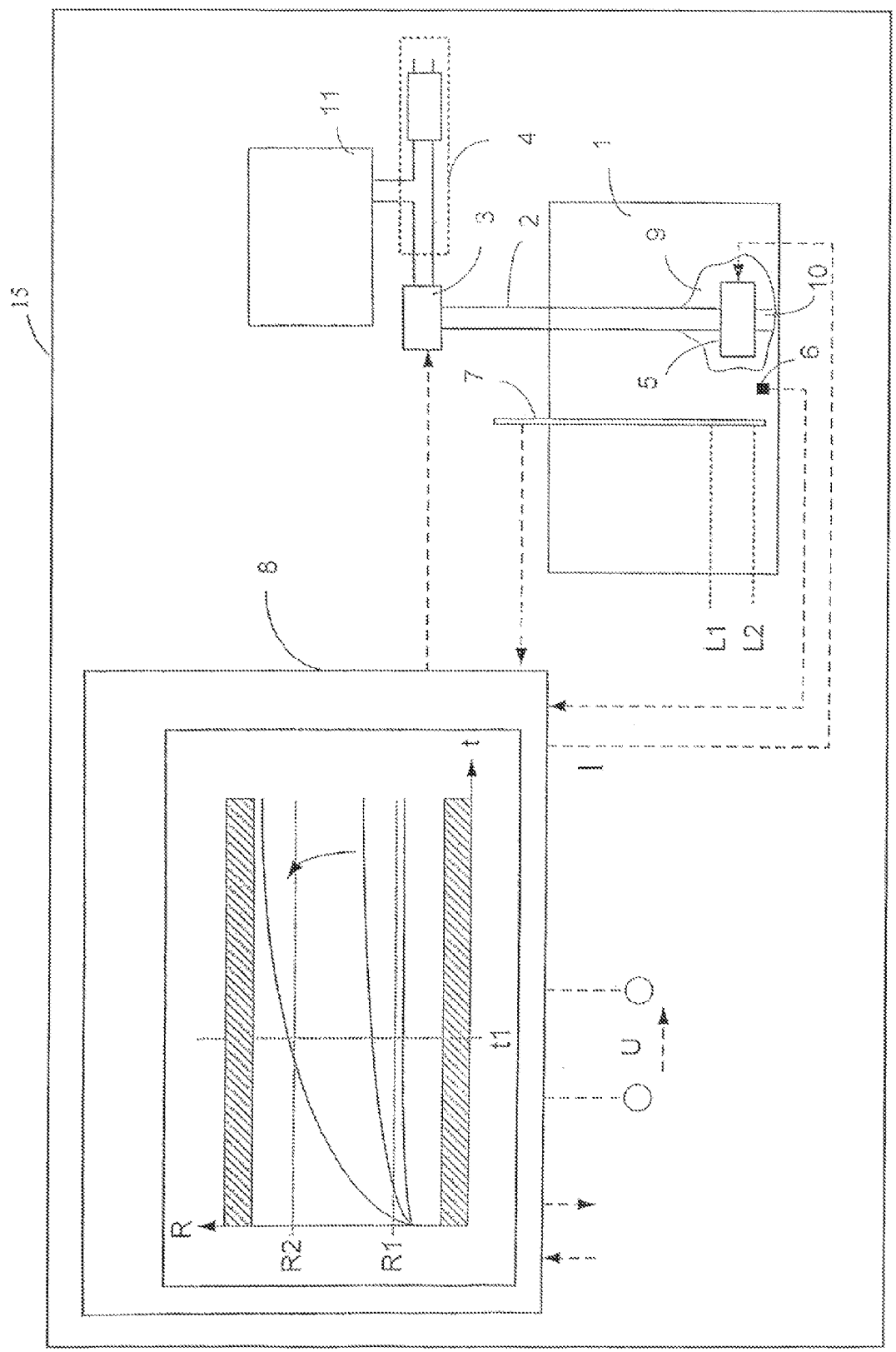

METHOD FOR SELECTIVE CATALYTIC REDUCTION OF NITROGEN OXIDES IN EXHAUST GAS OF INTERNAL-COMBUSTION ENGINES

CROSS-REFERENCE TO RELATED APPLICATIONS

This application is a continuation of PCT International Application No. PCT/EP2009/007465, filed Oct. 17, 2009, which claims priority under 35 U.S.C. §119 from German Patent Application No. DE 10 2008 056 860.0, filed Nov. 12, 2008, the entire disclosures of which are herein expressly incorporated by reference.

BACKGROUND AND SUMMARY OF THE INVENTION

The invention relates to a method for the selective catalytic reduction of nitrogen oxides in the exhaust gas of internal-combustion engines in motor vehicles, wherein a reducing agent is fed into the exhaust gas of the internal-combustion engine from a reducing agent tank internal to the vehicle.

From technical literature and utility vehicles, a method of this type is fairly well known, which is called the (Selective Catalytic Reduction) SCR method. By use of the known SCR method, nitrogen oxide emission is drastically reduced in the case of diesel engines and, by use of a urea solution as the most frequently used reducing agent—especially under the name AdBlue—, is converted to water vapor and nitrogen. AdBlue is carried along in motor vehicles in an additional tank (reducing agent tank) and is injected into the exhaust system. In connection with an SCR catalyst, metering devices in the exhaust system contribute to the reduction of nitrogen oxide emissions and soot particles. Since the urea solution freezes as early as at a temperature of approximately minus 12 degrees, it has to be heated at least in the area of the drain pipe in order to at least partially thaw AdBlue that may be frozen. As a result of the removal by suction of partially thawed urea solution, an ice cavity may form around the heating element and the suction point.

It is an object of the invention to improve the method of the above-mentioned type with respect to a detection and reduction of the formation of ice cavities.

According to the invention, this task is achieved by a method for the selective catalytic reduction of nitrogen oxides in the exhaust gas of internal-combustion engines in motor vehicles, wherein a reducing agent is fed into the exhaust gas of the internal-combustion engine from a reducing agent tank internal to the vehicle. An electronic control device, by way of the signal of a sensor in the reducing agent tank, detects whether the reducing agent is in a frozen state. The electronic control device applies heating current to a PTC heating element in the reducing agent tank if the reducing agent is in a frozen state. The electronic control device calculates the resistance of the PTC heating element from the onboard voltage of the motor vehicle and the heating current and compares the resistance with a first defined resistance threshold and/or with a first defined gradient threshold of the increase in resistance. The electronic control device reduces the amount of reducing agent fed into the exhaust system from the reducing agent tank if the first resistance threshold and/or the first gradient threshold is exceeded.

The invention is based on the following recognitions. The activating of the heating element takes place with the goal of heating the reducing agent. Heating increases the resistance of the heating element. The resistance therefore represents a measurement for the energy stored in the heating element, and the temperature change represents a measurement for the converted power. When the heating current is applied to the heating element, the PTC heating element will heat up and the resistance will rise. A temperature level and a resistance value will be set as a function of the energy input into the PTC heating element and of the wetting of the heating element. A resistance course is obtained when wetting degrees of the heating element differ. The course of the resistance may depend on the absolute supply of energy, the energy conductance corresponding to the wetting, the starting temperature, the time and the energy supply per time. However, in general, the final value and also the rise of the resistance will be the greater, the lower the wetting and thus the heat conduction.

According to the invention, a differentiation is therefore made between the following three operating conditions:

(1) Detection of Normal Operation (=Fully Wetted):

The resistance rises over a period of time to be defined and is adjusted such that the course of the resistance has a gradient of approximately zero. The adjusted resistance will then remain below the first resistance threshold and/or gradient threshold.

(2) Detection of Partial Wetting Operation:

If the resistance assumes a value above the first resistance threshold and/or gradient threshold, which suggests a partial wetting, but below a second resistance threshold and/or gradient threshold, which is defined for the recognition of an ice cavity—thus of an air environment that does not cool—, the carried-away reducing agent quantity will be reduced in order to permit an increased thawing of the frozen reducing agent.

(3) Detection of Ice Cavity:

If the second resistance threshold and/or gradient threshold for the ice cavity recognition is exceeded, stronger safety measures have to be taken than in the case of a partial wetting operation.

The invention not only ensures the implementability of an SCR method but also a simple diagnosis of the used components, such as the heating element or the level sensor. The reason is that the signals of the level sensor and of the resistance course of the PTC heating element can be made plausible by means of comparison when the position of the heating element with respect to the level sensor is known.

Other objects, advantages and novel features of the present invention will become apparent from the following detailed description of one or more preferred embodiments when considered in conjunction with the accompanying drawings.

BRIEF DESCRIPTION OF THE DRAWING

The drawing illustrates an embodiment of the invention. It is a schematic view of a system illustrating the most important components for implementing the method according to the invention.

DETAILED DESCRIPTION OF THE DRAWING

The single FIGURE shows a reducing agent tank 1 that, for example, contains a urea solution as the reducing agent. From the reducing agent tank 1, which is to be installed here in a motor vehicle 15 and has an internal-combustion engine 11, the reducing agent is fed by way of a drain pipe 2 via a pump 3 and, as required, additional metering devices into the exhaust system 4 of the internal-combustion engine 11. Since the urea solution freezes as early as at a temperature of approximately minus 12° C., it must be heated at least in the area of the suction point 10 of the drain pipe 2 in order to at least partially thaw the possibly frozen urea solution. For this purpose, a PTC heating element 5 is provided very close to the suction point 10, preferably on the floor of the reducing agent tank 1.

As a result of the removal by suction of partially thawed urea solution, an undesirable ice cavity 9 may form around the heating element 5 and the suction point 10. An electric control device 8 is connected with the pump 3 and/or other delivery devices for feeding the reducing agent into the exhaust gas. Furthermore, the heating element 5—here, a PTC heating element—is also connected to the control device 8 which, as required, applies heating current I to the heating element 5. The control device 8 preferably receives signals of a temperature sensor 6 and of a level sensor 7. The control device 8 is supplied by the onboard voltage U of the motor vehicle and, as required, may have additional input and output pins.

According to a preferred embodiment of the invention, the following process steps are carried out by way of the above-mentioned system.

For example, by way of the signal of the temperature sensor 6 in the reducing agent tank 1, an electronic control device 8 detects whether the reducing agent is in a frozen state. In addition or as an alternative, the detection of the state of aggregation can be carried out, for example, also by way of the level sensor 7 if the latter is constructed such that it can detect a sloshing motion or the conductivity of a medium. No sloshing motion takes place in the frozen state and the conductivity is low.

The control device 8 applies heating current I to the PTC heating element 5 in the reducing agent tank 1 when, according to the detected state-of-aggregation information, the reducing agent is in a frozen state. The control device 8 calculates the resistance R of the PTC heating element from the onboard voltage U of the motor vehicle and the heating current I. Subsequently, the resistance R or the course of the resistance R is compared in the control device 8 with a first defined resistance threshold R1 and/or with a first defined gradient threshold of the increase in resistance. By means of suitable measures, the electronic control device 8 causes a reduction of the reducing agent quantity fed into the exhaust gas if the first resistance threshold R1 and/or the first gradient threshold was exceeded because, in this case, a partial wetting and thus an imminent ice cavity formation is inferred. This means that the first resistance threshold R1 and/or the first gradient threshold is defined such that a transition from the fully wetted operation to the partially wetted operation is thereby recognized. It should be added that the control device 8 may, for example, be an engine control unit, which is present anyhow in the vehicle and is expanded by the concerned function, or an additional control device connected with an electronic engine control unit, for example, by way of a data bus. In the latter case, the control device 8 correspondingly informs the engine control unit, which, in turn, initiates a reduction of the reducing agent quantity by suitable measures. In the former case, the control device 8 itself can carry out a reduction of the reducing agent quantity, for example, by a corresponding activation of the pump 3.

When a second resistance threshold R2 and/or a second gradient threshold is exceeded, the first threshold R1 being lower than the second threshold R2, the electronic control device 8 will completely interrupt the feeding of the reducing agent from the reducing agent tank 1 into the exhaust system 4. Furthermore, the electronic control device 8 can emit a warning to the driver, at the earliest when the first resistance threshold R1 and/or the first gradient threshold is exceeded, or at the latest when the second resistance threshold R2 and/or the second gradient threshold is exceeded because, in the latter case, an unwetted heating element is already inferred.

This means that the second resistance threshold R2 and/or the second gradient threshold is defined such that, as a result, a transition is recognized from the partially wetted to the unwetted operation.

It should be added that the analysis of the resistance R includes the analysis of a value proportional to the resistance R, such as the conductivity 1/R, with corresponding defined threshold values. Here, the analysis of the power (U*I) is considered to be somewhat disadvantageous because, in this case, fluctuations in the onboard electrical system would have a negative effect on the accuracy of the analysis.

By means of the signal of the additional level sensor 7, the electronic control device 8 preferably checks whether the increase of the calculated resistance R is a result of an ice cavity 9 or a result of the low level in the reducing agent tank 1. If, for example, the level sensor 7 signals a level that is above a first level L1, the conclusion is drawn that there is an ice cavity 9. If, for example, the level sensor 7 signals a level that is between level L1 and a second level L2, the conclusion is drawn that there is an increasing partial wetting of the heating element 5 as a result of an increased emptying of the tank 1. In this case, for example, the second resistance threshold R2 can be raised. If, for example, the level sensor 7 signals a level that is below a second level L2, the conclusion is drawn that the tank 1 is empty or will soon be empty and, in this case, for example, a corresponding message is emitted to the driver. Level L1 is preferably defined to be just barely above the upper edge of the heating element 5. Level L2 is preferably defined to be just barely above the lower edge of the heating element 5, so that a measuring tolerance range is obtained in the event of level fluctuations.

The resistance ranges, which are hatched in the drawing, in the characteristic diagram of the resistance R, which is schematically illustrated and integrated in the control device 8 over the time t, may be defined as unacceptable areas for the recognition of a defect of the PTC heating element. The point in time t1 is to be the analyzing point in time of the characteristic resistance curves after a defined time period starting with the switching-on of the heating current I.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for selective catalytic reduction of nitrogen oxides in exhaust gas of an internal-combustion engine of a motor vehicle, wherein reducing agent is fed into the exhaust gas from a reducing agent tank internal to the vehicle, the method comprising the acts of:
    detecting, by way of a signal of a sensor in the reducing agent tank, whether the reducing agent is in a frozen state;
    applying heating current to a PTC heating element in the reducing agent tank if the reducing agent is in a frozen state;
    calculating a resistance of the PTC heating element from an onboard voltage of the motor vehicle and a heating current, and comparing the resistance with at least one of a first defined resistance threshold and with a first defined gradient threshold of an increase in resistance; and reducing the amount of reducing agent fed into the exhaust gas from the reducing agent tank if said at least one of the first resistance threshold and the first gradient threshold is exceeded.

2. The method according to claim 1, further comprising the act of:

checking, by way of a signal of a level sensor, whether the increase of the calculated resistance is a result of an ice cavity or a result of a low level in the reducing agent tank.

3. The method according to claim 1, further comprising the act of:

emitting a warning to a driver, at the earliest when said at least one of the first resistance threshold and the first gradient threshold is exceeded, or at the latest when said at least one of the second resistance threshold and the second gradient threshold is exceeded.

4. The method according to claim 3, further comprising the act of:

checking, by way of a signal of a level sensor, whether the increase of the calculated resistance is a result of an ice cavity or a result of a low level in the reducing agent tank.

5. The method according to claim 1, further comprising the act of:

interrupting the feeding of the reducing agent from the reducing agent tank into the exhaust pipe if at least one of a second resistance threshold and a second gradient threshold is exceeded, the first thresholds being lower than the second thresholds.

6. The method according to claim 5, further comprising the act of:

checking, by way of a signal of a level sensor, whether the increase of the calculated resistance is a result of an ice cavity or a result of a low level in the reducing agent tank.

7. The method according to claim 5, further comprising the act of:

emitting a warning to a driver, at the earliest when said at least one of the first resistance threshold and the first gradient threshold is exceeded, or at the latest when said at least one of the second resistance threshold and the second gradient threshold is exceeded.

8. The method according to claim 7, further comprising the act of:

checking, by way of a signal of a level sensor, whether the increase of the calculated resistance is a result of an ice cavity or a result of a low level in the reducing agent tank.

* * * * *